United States Patent [19]

Rice

[11] Patent Number: 5,290,959

[45] Date of Patent: *Mar. 1, 1994

[54] MASS SEPARATION OF MATERIALS

[75] Inventor: Wayne K. Rice, Wanatah, Ind.

[73] Assignee: Vitamins, Inc., Chicago, Ill.

[*] Notice: The portion of the term of this patent subsequent to May 17, 2005 has been disclaimed.

[21] Appl. No.: 839,906

[22] Filed: Feb. 21, 1992

Related U.S. Application Data

[63] Continuation-in-part of Ser. No. 18,404, Feb. 25, 1987, Pat. No. 4,744,926, and a continuation-in-part of Ser. No. 111,351, Oct. 27, 1987, abandoned, which is a continuation of Ser. No. 774,332, Sep. 10, 1985, abandoned.

[51] Int. Cl.$^5$ .............................................. C07C 1/00
[52] U.S. Cl. .............................. 554/11; 554/8; 554/12; 554/184; 554/193; 554/205; 426/417; 426/312
[58] Field of Search .................. 554/8, 11, 23, 184, 554/193, 205; 426/417, 312

[56] References Cited

U.S. PATENT DOCUMENTS

| | | | |
|---|---|---|---|
| 4,123,559 | 10/1978 | Vitzthum et al. | 426/312 |
| 4,168,324 | 9/1979 | Roselius et al. | 426/312 |
| 4,331,695 | 5/1982 | Zosel | 426/430 |
| 4,511,508 | 4/1985 | Heniz-Rüdiger et al. | 426/665 |
| 4,548,755 | 10/1985 | Stahl et al. | 260/412.8 |
| 4,744,926 | 5/1988 | Rice | 554/11 |

*Primary Examiner*—José E. Dees
*Assistant Examiner*—Deborah D. Carr
*Attorney, Agent, or Firm*—Cook, Egan, McFarron & Manzo, Ltd.

[57] ABSTRACT

An extraction process comprising contracting a material to be extracted with an extracting fluid at elevated pressure within a defined space, and separating the extracted fluid and extract as a mass, from the extracted material while reducing the volume of the defined space and while maintaining the elevated pressure within the defined space. Apparatus for carrying out the process is adapted to separate the extracting fluid and the extract, as a mass, from the extracted material, while maintaining elevated pressure and reducing the volume as the point of separation.

10 Claims, 2 Drawing Sheets

MASS SEPARATION OF MATERIALS

This is a continuation-in-part of application Ser. No. 018,404 filed Feb. 25, 1987, now U.S. Pat. No. 4,744,926 and of application Ser. No. 111,351 filed Oct. 27, 1987, now abandoned which are continuations of Ser. No. 774,332 filed Sep. 10, 1985 (now abandoned).

The present invention broadly relates to processes for separating materials, wherein the starting material, in solid form, is contacted with a fluid at elevated pressure to form a fluid mixture of the fluid and a component of the solid starting material. A mass transfer separation is then effected to separate the fluid mixture, as a mass, from the solids residue while the elevated pressure is maintained. Preferably, the mass transfer separation is effected with physical compaction of the solids residue. The process of the present invention may be used to separate materials resulting from extractions, fractionations, filtrations, chemical reactions and other processes. It is generally preferred that the fluid be gaseous at standard temperature and pressure.

The present invention also relates to apparatus for carrying out such processes and specifically contemplates a variable volume cylinder and a screw press for use in such material separation processes. The present invention broadly provides a process and apparatus having maximum flexibility as to time, temperature and pressure conditions applied to a wide variety of raw materials and, using a wide variety of fluids, produce maximum yields of the separated products, without the need to modify the equipment.

BACKGROUND OF INVENTION

The use of liquified gases and supercritical fluids to carry out extractions at high elevated pressure has been described in the prior art. Such prior art processes involve the use of liquified gases or supercritical fluids at pressures in excess of 3,000 to 5,000 psi, although in some cases the recommended pressures exceed 10,000 psi.

Processes for extractions run at extremely high pressures are described in the following U.S. Pat. Nos.: 4,156,688; 4,328,255; 4,466,923; 4,493,854; 4,495,207; and 4,683,063.

Generally speaking, these prior art processes separate the extracted material from the residual solids by an elution or dilution process, wherein the supercritical fluids are pumped through the material to be extracted over a period of time, and as the extracting fluid is pumped through the solids, the level of extractable liquid in the solids is gradually reduced.

SUMMARY OF THE INVENTION

The present invention broadly relates to processes for separating materials from solids, wherein the starting materials are contacted with a fluid at elevated pressure to form a fluid mixture (containing the fluid and a component of the starting material), and a mass transfer separation is then effected to separate the fluid mixture as a mass from the solids while the elevated pressure is maintained.

The process of the present invention is broadly directed to the separation of materials, particularly the separation of liquid or soluble components from solid materials. Thus the process of the present invention may be used in connection with extraction processes, filtration processes, fractionation processes and other similar processes wherein materials need to be separated. The present invention also contemplates that the fluids used in the process of the present invention may serve as the media for chemical reactions at elevated pressures and that the process of the present invention may be used to separate the products of the chemical reaction directly.

As used herein, the term "starting material", which is sometimes referred to as the "solid starting material", means any material having a component which may be solubilized (or dissolved) and separated from the solid residue, i.e., the non-solubilized material. The term "solid" means material which is a in a physical solid or a material which can be associated with a solid substrate, e.g., a liquid oil adsorbed on fullers earth.

As used herein, the term "fluid" is directed to materials, such as carbon dioxide, which are fluid at the temperature and elevated pressures used by the process of the present invention. The "fluid" may be in a supercritical under the conditions of the process. The fluid may serve as a solvent for the component being separated from the solid material. The fluid may also serve as the media for a chemical reaction.

As used herein, the term "fluid mixture" means the combination of the fluid and one or more solubilized components of the solids starting material which is formed after the fluid is contacted with a solid material at the desired temperature and elevated pressure. The fluid mixture may be a solution of the component in the fluid, although a solution is not necessarily required.

The present invention is based on the discovery that certain materials are highly soluble (or at least solulizable) in carbon dioxide at elevated pressure. Thus the present invention contemplates forming a solution (the "fluid mixture") of a fluid, such as carbon dioxide, and the soluble portion of the solid starting material at elevated pressures and while the elevated pressure condition is maintained, effecting a separation of the fluid mixture from the solid residue. The separation at the elevated pressure is accomplished by the process of the present invention, wherein the volume of the apparatus is reduced as the fluid mixture is removed from the apparatus and the rate of reduction of the volume of the apparatus is controlled to approximate the rate at which the fluid mixture is removed from the apparatus is continued. Preferably, the mass transfer separation of the fluids from the solids is accomplished by continuing to reduce the volume if the apparatus until some compaction of the solid residue is achieved.

The first essential step of the process of the present invention comprises contacting the fluid with the solid starting material at an elevated pressure level in order to form a fluid mixture. The pressure and temperature of the contacting step is selected to control the composition of the fluid mixture. The second essential step comprises the separation of the fluid mixture, as a mass from the solid residue, while the pressure on the system is maintained at the selected level. It is critical that the elevated pressure be maintained while the mass transfer separation is accomplished in order to maintain the composition of the fluid mixture throughout the separation step. Preferably, the residual solid material is compacted, while maintaining the elevated pressure, in order to more completely expel fluid mixture from the apparatus.

The fluid mixture which is removed from the apparatus at high pressure can be effectively and completely separated thereafter. The extracting fluid may be recycled for further extractions.

Figure 1:
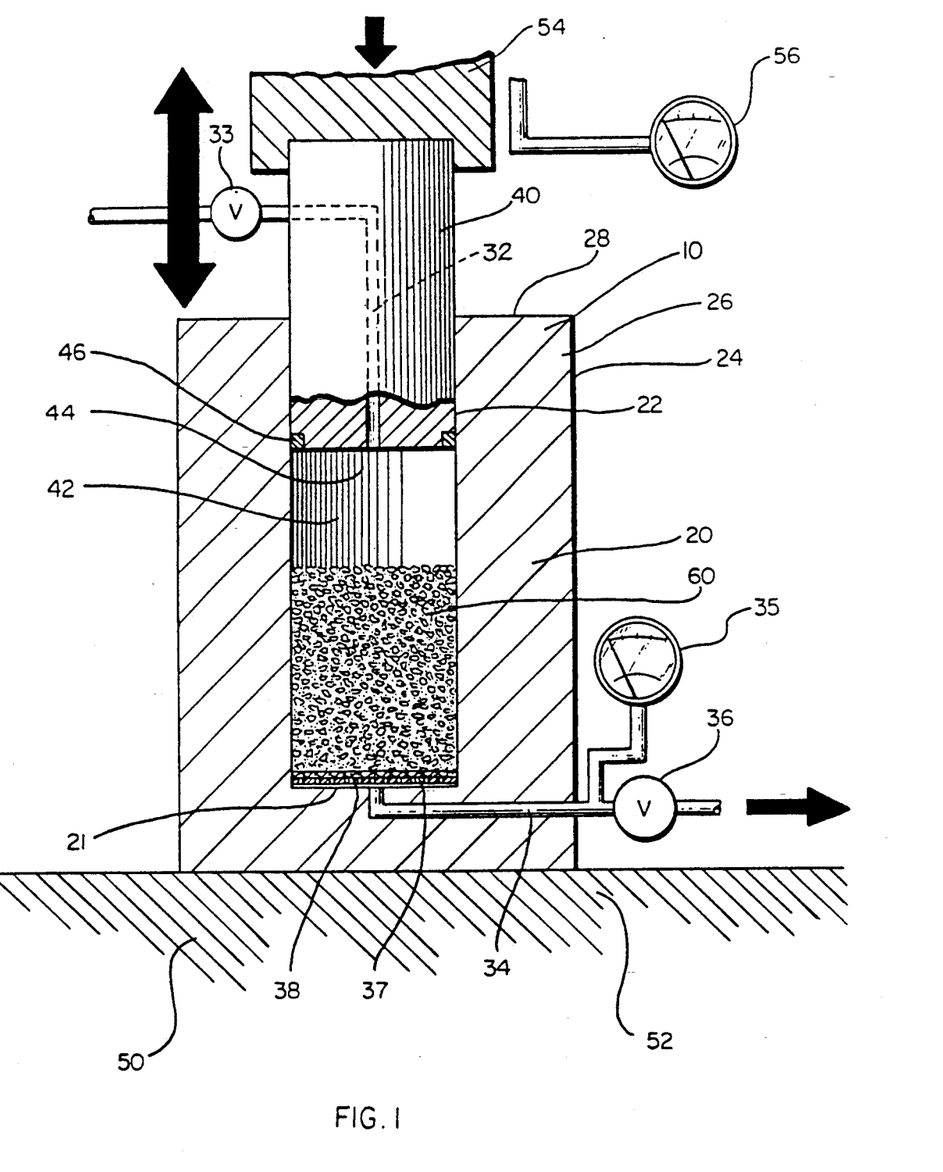
FIG. 1 is a schematic diagram of a variable volume cylinder apparatus shown in cutaway side view.

Other objectives, advantages and capabilities of the present invention will become more apparent as the description proceeds, taken in conjunction with the accompanying drawings in which:

APPARATUS - FIG. 1

Referring to FIG. 1 of the drawings, variable volume cylinder apparatus of the present invention is shown generally at 10. Basically, the apparatus 10 comprises thick-walled cylinder 20 within which is mounted piston 40. The apparatus 10 is operationally positioned within hydraulic press 50.

The cylinder 20 generally comprises a thick-walled stainless steel vessel with a closed bottom 21 having a cylindrical inner surface 22 adapted to mate with piston 40. Piston 40 is adapted to move within the bore of cylinder 20, thereby defining the variable volume cylinder 42 which serves as the extraction vessel. Piston 40 is removable from cylinder 20 in order to allow charging of the solid starting material 60. Preferably the shape of the bottom 21 of the cylinder approximates the shape of lower face 44 of piston 40, so that when the piston 40 is fully lowered, the effective volume of cylinder 42 is minimal and the solid material 60 may be compacted under considerable force. The outer wall 24 of cylinder 20 defines wall 26 which is sufficiently strong to maintain the desired pressures, e.g., 15,000 psi., with an appropriate safety factor.

It is preferred that the length of cylinder 20 be sufficient to maintain piston 40 in an axial alignment with the cylinder wall 26. Similarly, piston 40 must have sufficient length to maintain the axial relationship with the inner surface 22. Seal 46 on piston 40 provides a pressure seal adequate to avoid loss of pressure in the cylinder at the operating pressures, e.g., 15,000 psi or higher. The seal may comprise an O-ring within a cup, but other forms of seals may also be used. As will be apparent to those skilled in the art, other styles of seals and other locations of the seals may be used. For example, for processes to be run at high temperature, the seal may be located near the upper end of the piston. Fluid charging port 32, within piston 40, is adapted to introduce the fluid axially into the cylinder 20 at the desired pressures. Fluid charging port 32 is connected through valve 33 to a fluid supply (not shown).

At the cylinder bottom 21, liquid discharge port 34 connects the cylinder to a recovery vessel (not shown) through discharge valve 36. Perforated plate 37 and gauze pad 38 are installed in the bottom of the cylinder above discharge port 34. The perforated plate 37 has a plurality of holes through its thickness and preferably has grooves in the bottom interconnecting the holes and discharge port 34. The perforated plate 37 and gauze pad 38 allows the fluid mixture to be separated from the solid residue over the whole area of the piston and to prevent the solid residue 60 from being forced into discharge port 34. In some embodiments, a sintered plate may be used with or in lieu of the perforated plate 37 and gauze pad 38. A pressure gauge 35 is connected to discharge line 34 in a manner to register the pressure at the base 21 of cylinder 20. A similar gauze pad and perforated plate (not shown) may be used above the solid starting material 60 and below piston 40 to distribute the fluid from charging port 32 over the whole area of the piston and to avoid any blockage of charging port 32.

The hydraulic press 50 must be large enough to accommodate the variable volume cylinder apparatus 10, and strong enough to move piston 40 into the cylinder 20 to create or maintain the desired pressures and to maintain the desired pressures as the fluid mixture is removed from the cylinder. Generally the variable volume cylinder apparatus 10 rests on and is supported by base 52 of hydraulic press 50. The piston 54 of the hydraulic press couples with the upper portion of piston 40 and is adapted to move piston 40 vertically. Gauge 56 is connected to the hydraulic system of the press and reads the force being exerted on cylinder 20 by the hydraulic press 50.

It is preferred that inner surface of cylinder 22 be smooth and free from surface blemishes, including inlet or outlet ports. Accordingly, it is preferred that the fluid charging port 32 be arranged within the piston 40, and that the discharge port 34 be positioned axially, or below the piston. In this embodiment, the piston seal 46 will not encounter any discontinuous surfaces in the face of the cylinder wall.

In order to operate the apparatus of FIG. 1, the piston 40 is removed from cylinder 20 and the solid starting material 60 is charged into the cylinder 20. Piston 40 is then placed in cylinder 20 as shown in FIG. 1 where it forms a gas-tight seal above charging port 32. It may be desirable to purge air from the cylinder using the fluid in order to remove any oxygen or other gases not required or desired for the separation process. This may be done by charging the extracting fluid through port 32 while valve 36 is open.

After any required purging has been accomplished, valve 36 is closed and the charging of the fluid is continued until the desired level of fluid has been charged to the cylinder through port 32.

The amount of fluid charged may vary over wide limits, depending upon the nature of the fluid, the nature of the solid starting material and the nature of the separation to be made. Many of the Examples which follow illustrate the use of carbon dioxide as the fluid wherein a variety of ratios of gas to solid starting materials have been used.

The desired pressure within the cylinder may be achieved either by charging sufficient fluid to achieve the pressure without movement of the piston or, alternatively, by charging a lesser amount of fluid and achieving the desired pressure by moving the piston down into the cylinder. The pressure used will be dependent upon the nature of the fluid used and the solid material to be treated. Pressures of about 12,000 psi are useful for extracting wheat germ and soybeans with $CO_2$. The temperature at which the process takes place may vary over wide limits, depending upon the nature of the solids, the extracting fluid and the pressure used. The temperature is selected to achieve the desired level of solubility of the extract in the extracting fluid.

In connection with the treatment of certain solid starting materials using certain fluids, it may be desirable to allow an induction period, wherein the solid material is allowed to remain in contact with the fluid at selected temperatures and pressures for a limited period of time, prior to the separation step.

After any required induction period has been completed, the fluid mixture is then separated as a mass from the solids residue. In the simplest case, pressure reduction valve 36 is opened slightly to slowly bleed off the fluid mixture from cylinder 42 through outlet 34. The downward movement of the piston 40 into cylinder 20 is continued at a coordinated rate necessary to maintain the pressure in the vessel at the desired level to maintain the solubility of the soluble component in the fluid, i.e., the composition of the fluid mixture. The downward movement of the piston is continued until the residual solids become essentially a solid mass at which time the pressure generated by the hydraulic press, as shown by gauge 56, rises with little further downward movement of the piston 40. The discharge of the fluid mixture through discharge valve 36 can be continued, but the pressure shown at gauge 35 does not increase because at this point essentially all of the fluid mixture has been bled from the cylinder.

The solid starting material may be partially compacted before it is placed into the cylinder for treatment, but extensive compaction is preferably avoided. There is no general requirement for any pretreatment of the solid starting material. In other words, seed which are whole, flaked or steamed prior to treatment may be used, but the yields may differ depending upon the seed used and the particular pretreatment.

Using the apparatus shown in FIG. 1, the solid starting material is charged by removing piston 40 from cylinder 20. The present invention contemplates a wide variety of charging mechanisms. For instance, an open ended cylinder may be equipped with two opposed pistons which are timed to charge and discharge cakes of the material to be extracted. The use of a cylinder with two open ends provides advantages as to fabrication and maintenance. Alternatively, the cylinder may be equipped with an axial breach lock mechanism to permit the opening of the bottom of the cylinder to load the solid starting material without the need to remove the piston from the cylinder. Breach lock mechanisms, such as are used in large guns which are secured by interrupted threads and suitable sealing mechanisms, may be used. If desired, the outlet port for the cylinder, including the necessary valving, may be built into the breach block mechanism.

The present invention is not limited to any specific ratio of piston diameter to piston stroke. Generally speaking, it is contemplated that increasing the ratio of the piston stroke to the piston diameter is advantageous for the solid starting materials containing a relatively high level of components to be separated.

The apparatus of FIG. 1 provides for great flexibility in carrying out the process of the present invention in that the time, temperature and pressure used to carry out the separation of components from various raw materials can be readily selected and controlled without the need to modify the equipment. The type and amount of fluid may be varied and controlled, again without the need to modify the equipment.

Figure 2:
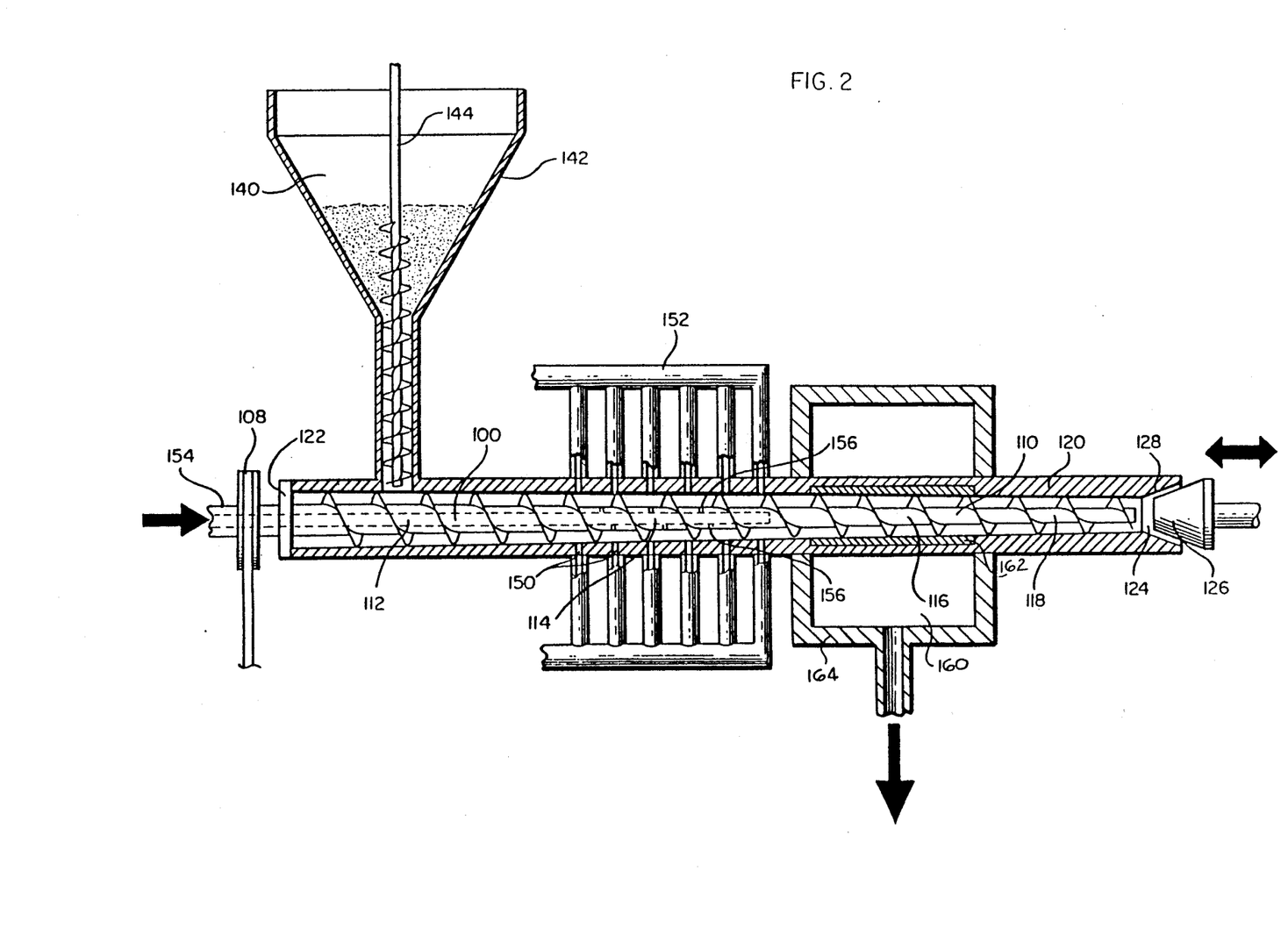
FIG. 2 is a schematic diagram of a screw press apparatus, shown in cutaway, side view.

APPARATUS - FIG. 2

The apparatus illustrated in FIG. 2 is fundamentally a screw press or screw mill or expeller type device 100 which comprises a screw 110 within barrel 120. Barrel 120 is closed at the input 122 end and at output end 124 is precision fitted with adjustable cone valve 126, which has a shape complimentary to tapered opening 128 in barrel 120. Screw 110 is driven by drive means 108. Screw mill 110 is divided into four different sections, namely sections 112, 114, 116 and 118, wherein the flights of the screw in these sections are constructed to carry out different functions.

At the input end of the press 100, the screw flights in section 112 are designed to form a plug of solid starting material. The screw flights in section 114 are designed to masticate the compressed plug while fluid is injected at elevated pressure into the barrel of 120 of mill 100. The mastication of the plug is essential to achieve intimate contact of the fluid with the solid starting material to be extracted. The mastication may be achieved through the interrupted flights and/or fingers or dams or other flow restricting devices within the barrel. The objective of section 114 is to masticate the solid starting material in contact with the compressed fluid and thus provide for complete contact at the desired temperature and pressure, whereby the fluid mixture is formed. The screw flights in section 114 transport the fluid mixture and the residual solids to section 116, which provides for a controlled release of the fluid mixture into manifold 160 through porous sieve 162. Finally, the residual solids move by the screw flights in section 118, to transport the residual solids to output end through adjustable precision fit cone valve 126.

Material feed means 140 is designed to feed the solid starting material to the screw press at the input end in section 112. The feed means may include feed hopper 142 and feed screw 144.

The fluid may be injected into the screw press using a variety of mechanisms. In the preferred embodiment, barrel 120 includes fluid inlets 150, around periphery of barrel 120, which surrounds section 114 of the screw, in a manner which permits injection of the fluid while maintaining the pressure at the desired levels, e.g., 12,000 psig. Fluid inlets 150 communicate with a fluid supply (not shown) through manifold 152.

Alternatively, the fluid may be injected into the screw press 100 through an axial opening 154 in screw 110, which communicates with inlet openings 156 in section 114 of screw 110.

Recovery zone 160 generally comprises an annular porous sieve 162, adapted to communicate fluid pressure in section 116 to pressure housing 164 through barrel 120. In this embodiment, the pressure within housing 164 is controlled to provide a suitable pressure drop between the interior of the screw press at section 116 and the recovery system so that high pressure fluid mixture emerges from the screw press to recovery system 160.

After passing through recovery zone 116, the residual solids are transported through zone 118 to opening 124, at which time they are discharged from barrel 120 through adjustable precision fit cone valve 126, thus emerging as a compacted solid at atmospheric pressure.

In operation, the material feed hopper 142 may be filled with soybean flakes or a similar material to be extracted. Feed screw 144 forces the soybean flakes under pressure into the screw press at section 112 where a plug of material to be extracted is formed. In section 112, the flights of screw 110 are adjacent to the inner surface of barrel 120. The screw is turned at a rate which causes compaction of the input flakes sufficiently to withstand the desired operating pressures of the extraction, and prevent any blow back of high pressure extracting fluid. The compacted flakes are then transported to section 114. At this point, the flights of screw 110 do not create any further compaction or any increase in pressure, but permit the extracting fluid from inlets 150 and/or 156 to contact and mix with the compacted material to be extracted. The material to be extracted is thus mixed with the extracting fluid while the mixture is transported from section 114 into section 116.

Within section 116 the flights of screw 110 are separated from porous media 162 in order to build up a slight cake of solids which function as a filter which helps to avoid the extrusion of solids into the porous media 162. The porous media 162, however, permits the fluid materials to bleed through from the section 116 to recovery area 160. As this happens, the solids are progressively transported from section 116 to section 118. No further compaction is required in section 118. The extracted material is transported to the adjustable cone valve solids outlet 126 for discharge and recovery. The internal system pressure will assist the transport of solids to and through the precision cone valve 126.

The Fluid

In carrying out the invention, a wide variety of fluids may be used. Although most of the Examples herein below illustrate the use of carbon dioxide as the fluid, the present invention is not limited to any specific extracting fluid.

Generally it is preferred to use an extracting fluid which is normally gaseous, such as $CO_2$. For the separation of many materials the use of $CO_2$ at supercritical conditions is preferred. However, one may also use fluids which are liquid at normal conditions, but which are gaseous at the extraction temperature and at atmospheric pressure, such as ethanol. Fluids which are gaseous provide enhanced mass transfer separation of the fluid mixture from the residual solids. Gaseous fluids may be readily separated from separated components, which provides obvious advantages.

Other than $CO_2$, the present invention contemplates the use of nitrogen, nitrous oxide, freons, low molecular weight hydrocarbons such as ethane or propane and mixtures thereof. The present invention contemplates the use of hexane, isopropanol, propylene glycol and other solvent-type materials as the extracting fluid. Liquid solvents may be employed for some purposes either alone or with gaseous extracting fluids. Mixtures of extracting fluids and multiple or sequential extractions using different extracting fluids are also contemplated.

For most purposes, it is preferred to use the carbon dioxide at temperatures and pressures which provide for supercritical conditions, i.e., above 31.1° C. and above 73.8 bar, however, subcritical conditions may also be used for some purposes. If gases other than carbon dioxide are used, the ranges with respect to the temperatures and pressures outlined hereinafter in the specification can be obtained from data described in handbooks of physical chemistry.

The ratio of fluid, e.g., $CO_2$ to solid material, may vary over wide limits. The following Examples illustrate the use of ratios as high as 25 to 1 ($CO_2$ to solids, by weight), but higher ratios may be used. Economics normally favor the use of relatively low ratios, e.g., 4 to 1 or less, depending upon the particular separation being made.

The present invention also contemplates mixing the solid material with the fluid before the solid material is charged to the extraction vessel. For example, carbon dioxide, in the form of dry ice, may be premixed with oil-bearing seeds and the mixture of dry ice with the oil-bearing seeds thereafter charged to the extraction vessel. It is contemplated that the addition of solid dry ice particles to oil seeds prior to passing the oil seeds through a conventional screw press in a deoiling process would enhance the recovery of oil from such a process.

Temperature

A wide variety of temperatures may be employed in separation processes of the present invention. Temperatures of from 0° C. to 500° C. or higher may be used. Higher temperatures may be preferable in that the resulting fluid mixture may be more mobile, although the fluids may be somewhat less effective as solvents at higher temperatures. Such factors as the moisture in the solid starting material can vary the optimum conditions for carrying out the separation.

Pressure

The pressure (and the temperature) used in the process of the present invention should be adjusted to achieve the desired solubility conditions when the fluid is in contact with the starting materials. For some processes, such as filtration, it is preferred to select pressure (and temperatures) which give the maximum solubility and minimum viscosity of the liquids being separated from the solids. In other processes, such as fractionation, the pressure and temperature conditions should be selected to effect the most efficient separation of the fractions which are sought. Adjustment of the pressure can be used to control the composition of the fluid mixture, in that the pressure will control the quantity of the starting material dissolved in the fluid. Thus adjustment of the pressure (and temperature) can be used to control the nature and yield of the material being separated from the solid starting material. The Examples which follow illustrate the use of pressures between 500 and 12,000 pounds per square inch. However, the present invention is not so limited and pressures outside the range may be used. A wide variety of fluids and operating temperatures and pressures may be used. The present invention further contemplates the multi-cycle processes using different pressures during each cycle of the process.

It is considered essential to maintain the pressure in the vessel while the fluid mixture is separated from the residual solids and the fluid mixture is discharged from the extraction vessel. The pressure during the separation need not be the maximum pressure, nor is it necessary to maintain a uniform pressure in the vessel throughout the separation. For certain materials, it may be desirable to permit a dwell time wherein the fluid is maintained under pressure in contact with the solid material.

Compaction

A preferred embodiment of the present invention contemplates the compaction or physical crushing of the solid material as the fluid mixture is separated from the solids in order to expel the maximum amount of the fluid mixture. The compaction functions to enhance the mass transfer separation of the fluid mixture from the solid residue. In the case of seed vegetables, the compaction will collapse the voids in the solids and thus enhance the displacement of the $CO_2$-oil mixture from solids. Tests have shown that using the apparatus of FIG. 1 that an extraction without compaction will leave a solid residue with as much as 3% retained oil, while an extraction run under generally the same conditions, but with compaction, will produce a cake with less than 1% of retained oil.

It has been found that using the variable volume cylinder described above and shown in FIG. 1, that better yields of the extracted liquids are achieved by charging sufficient material to be extracted into the cylinder to form a cake of some depth, e.g., one inch thick, after compaction. It is postulated that a thick cake is less prone to channeling of the extracting fluid than a relatively thin cake.

Recovery Of Separated Materials

The fluid mixture which is removed from the high pressure chamber may be separated by simply allowing the carbon dioxide to volitalize.

Alternatively, the fluid mixture removed from the variable volume cylinder may be retained under reduced, but substantial pressures, e.g., 1,500 psi. Under such conditions, the solubility of the separated components may be changed sufficiently to allow recovery of the separated component from the fluid without volatilizing the fluid. The fluid may be retained at elevated pressure, e.g., 1,500 psi, for recycling through the separation.

Solid Materials Separated

The process and apparatus of the present invention may be applied to separate a wide variety of components from a wide variety of solid starting materials. The process of the present invention may be used to separate solids, such as waxy materials, which are soluble in the fluid at the selected elevated pressures from the solid material. The present invention also contemplates the extraction of liquids from other liquids or semi-solid materials by affixing the liquids to a solid carrier.

As is illustrated by the examples, the present invention may be adapted to separate a wide variety of materials. In addition to the extraction of oils from wheat germ and soybeans, the present invention also contemplates extracting caffine from coffee or tea, hops extraction, the extraction and fractionation of residual oils from various substances including petroleum products from oil shale or tar sands. It is further contemplated that the processes and products of the present invention may be used to recover diluted solvents from water, diesel oil from drilling muds and other compounds, to regenerate activated carbon and other adsorbants which are contaminated with organics, coal liquefication or extraction, to remove oils from used activated clay, to remove impurities from polymer melts, separating waxes and resins from residual oil, delignification and pulping of wood, oxidation of hazardous wastes and deashing synthetic fuels.

The process and apparatus of the present invention may be used to extract colors, flavors, essences and medicinal products, such as drugs, from such natural products as roots, bark, leaves, flowers and seeds. For example, colors may be extracted from annato, turmeric and cochineal; oleoresins may be extracted from roots and the like. Similarly, animal based products, such as wool, glands, liver, pancreas and spinal cord may be extracted. It is further contemplated that the present invention may be used to harvest cuticles from wool. The present invention also may be used to produce marine source products, such as separation and concentration of selected fatty acids from marine lipids.

The process and apparatus of the present invention is particularly useful in carrying out the extraction of oil from seed vegetables as is described in U.S. Pat. No. 4,493,854 to Friedrich and Eldridge, the extraction of lipids from lipid containing materials as described in U.S. Pat. No. 4,466,923 to Friedrich, and the production of food grain corn germ as described in U.S. Pat. No. 4,495,03 to Christianson and Friedrich, in extracting coffee oil from roasted coffee as described in U.S. Pat. No. 4,328,255 to Roselius, Vitzthum and Hurbert, and in fractionating butterfat as described in U.S. Pat. No. 4,504,503 to Biernoth et al.

The following examples will serve to illustrate the process of the present invention in the separation of several different materials, but it is understood that these Examples are set forth for illustration and many other products may be extracted using suitable variations. Unless otherwise stated, the procedures illustrated by the Examples were carried out in a variable volume cylinder of the type shown in FIG. 1.

EXAMPLE 1

The cylinder had an outside diameter of 5 inches and was 11¾ inches high with a central bore 2¼ inches in diameter and 9⅝ inches long. The piston was 10 inches in length and 2¼ inches in diameter, which gave it an effective area of 3.96 square inches. The effective stroke of the piston was about 5 inches.

A wad of gauze 38 was placed at the bottom of the cylinder above perforated plate 37. The cylinder was charged with 100 grams of full-fat wheat germ meal containing about 10.5% fat. A wad of gauze was placed over the charge of wheat germ meal and a perforated plate was placed on top of the gauze. Valve 36 was opened to permit the escape of any gases in the system. Valve 33 was closed throughout the experiment.

The piston was inserted in the cylinder and hand closed. The uncompressed cake was about 4 inches high. The cylinder was maintained at a temperature of about 90°–95° C. throughout the experiment. The hydraulic press was engaged and the piston moved downwardly 2.75, at which time gauge 56 showed a reading of 30 tons, which is approximately 15,000 psi pressing on the cake in the cylinder. The cake was about 1.25 inches thick and had a specific gravity of 1.1. No oil was discharged from the apparatus during this experiment, although traces of oil could be seen on the gauze.

EXAMPLE 2

Using the apparatus described in Example 1, 100 grams of full-fat wheat germ meal were placed in the cylinder. Cotton gauze and a perforated plate were placed on top, according to the procedure of Example 1. The cylinder was maintained at 90°–93° C. Valve 36 was closed and carbon dioxide was charged to the system through valve 33 to a pressure in the cylinder of 1,100 psi. This charged about 100 grams of $CO_2$ into the cylinder. When the charging had been accomplished, gauge 56 read about 2 tons which is equivalent to 1,000 psi in the cylinder. Valve 33 was closed and piston 40 was lowered until gauge 35 showed the gas pressure within the cylinder was 12,000 psi. At this point, valve 36 was opened to permit the discharge of a mixture of $CO_2$ gas and wheat germ oil, while the piston was lowered to hold the pressure at 12,000 psi.

About 7 grams of a very cold, thick oil emerged from valve 36 during a 30-40 second interval. The operation of the hydraulic press was continued until the force shown by gauge 56 began to rise above 24 tons, which was equivalent to 12,000 psi within the extraction cylinder, without any increase in the gas pressure shown by gauge 35.

The resulting compressed cake was smaller than the cake produced in Example 1 and had a lighter color. The cake had about 4% retained oil which indicates about 60% of the original oil was removed.

EXAMPLE 3

Using the equipment and procedure of Example 1, 100 grams of wheat germ was placed in the cylinder and $CO_2$ gas was charged continuously until about 12,000 psi was reached. This provided a ratio of 3 parts of gas by weight for each part of meal.

A few seconds after the operating pressure of 12,000 psi was reached, the carbon dioxide-wheat germ oil was bled off through valve 36 while maintaining the pressure with a hydraulic press. Again, the pressure was maintained on the cake until all of the $CO_2$ and dissolved wheat germ oil had been discharged. The resulting cake contained 1.1% oil (based on an ether extract).

Similar to Example 2, continued pressure on the cake with the hydraulic press did not discharge any additional oil.

EXAMPLE 4

Using an apparatus described in Example 2, the cylinder was charged with 100 grams of full-fat wheat germ meal and pressurized with nitrogen gas to 2,500 psi. The piston was lowered using the hydraulic press to achieve 12,000 psi whereupon valve 36 was opened to discharge the nitrogen gas and entrained oil. As the nitrogen was removed, a quantity of oil was recovered.

The piston was raised and the cylinder was again charged with 2,500 psi of nitrogen (at 92° C.). Again, the piston was lowered to achieve 12,000 psi and the nitrogen-entrained gas was discharged through valve 36. An additional quantity of oil was recovered leaving a residual fat of about 5% in the cake (based on ether extract).

The cake had a similar appearance to the cake in Example 2. The use of nitrogen gas, as illustrated in Example 4, was found advantageous in that nitrogen does not demonstrate a pronounced refrigeration effect. Thus, problems with freeze up of valves and plugging of lines are largely avoided through the use of nitrogen.

EXAMPLE 5

A variable volume cylinder similar to that shown in FIG. 1 was used, but the cylinder had a gas injection port through the sidewall of the cylinder near the top of the cylinder.

The cylinder was charged with 40 grams of full-fat, raw soybean flakes. The piston was put in place to form a gas tight seal above the gas injection port. The cylinder was flushed with carbon dioxide to thoroughly purge any air. Valve 36 was then closed.

The temperature of the cylinder was heated to 52°. The heaters were turned off and $CO_2$ at 1,300 psi was applied to the cylinder until the flow stopped. Approximately 2 parts by weight of $CO_2$ were used for each part by weight of soy flakes. The gas charging valve 33 was closed and the piston was gradually lowered using the hydraulic press. At the beginning of the downstroke, the piston was 5 inches from the bottom of the cylinder. When the piston was 1.75 inches from the bottom, the pressure in the cylinder was 12,000 psi. At this point the pressure release valve was opened to bleed the $CO_2$-soybean oil off at a rate sufficient to maintain the pressure at 12,000 psi, while the piston was continuously lowered. When the piston was to 0.75 inches above the bottom, essentially all of the gas had been removed from the cylinder and the pressure on the hydraulic press rose to 30 tons without any further increase of extraction fluid pressure within the extraction vessel.

The piston was removed and the soybean flake residue recovered. The process, which consumed approximately 5 minutes, reduced the oil content of the soybean flakes from 17.6% to 3.7%, as determined by ether extraction.

The approximate dynamics of Example 5 are shown in Table I below.

TABLE I

| Trial Minutes | Piston-Inches From Bottom | Press Pressure Tons | Cylinder Pressure |
|---|---|---|---|
| 0 | 5 | 3 | 1,300 |
| 0.2 | 4 | 4 | 1,400 |
| 0.4 | 3 | 5 | 1,500 |
| 0.6 | 2.5 | 10 | 1,700 |
| 0.8 | 2 | 18 | 4,000 |
| 1.0 | 1.75 | 24 | 12,000 |
| 3.0 | 1.25 | 24 | 12,000 |
| 5.0 | 0.75 | 30 | 12,000 |

EXAMPLE 6

The apparatus of Example 5 was charged with 100 grams of full fat, soy flakes, which included the hulls of the beans. The soy contained approximately 17% fat and 12% moisture. The soy flakes filled occupied the lower 3 inches of the cylinder.

The piston was inserted and the cylinder was purged with carbon dioxide. After purging, valve 36 was closed and the cylinder charged to 1,500 psi with $CO_2$. Using an external pump, additional $CO_2$ was pumped into the cylinder until the pressure reached 12,000 psi. This provided 3 parts by weight of $CO_2$ for every one part by weight of soybean meal. The flakes were permitted to soak in the pressurized $CO_2$ for 20 minutes.

The temperature of the cylinder was heated to 51° C. and the pressure release valve was opened to bleed off the $CO_2$-soybean oil at the bottom of the cylinder while additional $CO_2$ was pumped into the top of the cylinder at a rate sufficient to maintain the pressure at 12,000 psi. The pumping of the $CO_2$ at 12,000 psi was continued until 30 parts by weight of gas for each part by weight of soybean flakes had been passed through the soybean flakes. The $CO_2$ initially emerging from the cylinder was saturated with soybean oil, but as the process continued the amount of soybean oil in the gas declined. The piston was not lowered during this test. The $CO_2$ emerging at the end of the process contained essentially no oil. Analysis of the cake showed that it contained 2.62 retained oil (based on an ether extraction).

EXAMPLE 7

Using the apparatus described in Example 1, the cylinder was again loaded with 100 grams of full-fat soy flakes described in Example 6. The cylinder was purged using $CO_2$, after which the cylinder was charged to 1,500 lbs. using $CO_2$. An external pump was used to increase the $CO_2$ pressure to 12,000 psi which gave a weight ratio of 3 to 1 gas to meal. This again was allowed to soak for 20 minutes at 65° C.

After the soaking, the pressure release valve was opened to start to bleed out the $CO_2$-soybean oil mixture while the piston was lowered to maintain the pressure at 12,000 psi. The process continued until the cake was compressed from the initial 3 inches to 1 inch.

The resulting cake contained 2.39% retained fat (based on an ether extract) and a moisture of about 13.42. This indicates little, if any, moisture was extracted, but only one-tenth the amount of gas was used as compared to Example 6.

EXAMPLE 8

Using the apparatus described in Example 1, 100 grams of soybean flakes, as described in Example 6, were charged into the cylinder.

The cylinder was purged with nitrogen at 2,800 psi and then the purge valve was closed and the nitrogen was charged to 2,800 psi. An external pump was used to pump additional nitrogen into the cylinder until the pressure reached 12,000 psi.

This was allowed to soak for 20 minutes at a temperature of 55°-63° C. The pressure release valve was opened to allow the nitrogen-soybean oil to bleed out of the cylinder while the piston was lowered to maintain the pressure at 12,000 psi. No refrigeration affects were noticed by the release of the nitrogen. No oil was noted in the initial discharge of the nitrogen, while the ram was closed from 5 inches to about 2 inches. However, during the last 1 inch stroke of the piston, a great volume of oil was released with the nitrogen.

Analysis of the soybean flake cake retained in the cylinder showed 2.36% retained oil with a moisture content of 13.07.

The soybean meal recovered from the cylinder has a specific gravity of about 1.1 which is approximately the same as the specific gravity of $CO_2$ at 12,000 psi.

EXAMPLE 9

An extraction procedure was carried out in the same manner as in Example 8, except that Argon gas was used in place of nitrogen. The retained soybean cake contained 9.61% retained fat and a moisture of 13.37%. This indicates Argon did not have the same affect as nitrogen with respect to the extraction of oil from soybean flakes.

EXAMPLE 10

The apparatus of Example 1 was charged with 33 grams of raw wheat germ meal. The meal contained approximately 9% by weight of fat and about 13% by weight of moisture.

Using the procedure of Example 7, the cylinder was purged with 1,500 psi $CO_2$. The purge valve was closed and the $CO_2$ was admitted until 1,500 psi was reached. $CO_2$ was then continuously added by an external pump until 12,000 psi was reached. This provided 11 parts by weight of gas to each part by weight of meal. The temperature was maintained at 66° C.

After a dwell time of about 1.5 minutes, the discharge valve was opened and the piston was lowered to hold the pressure at 12,000 psi.

The discharge of the $CO_2$-oil required about 3½ minutes to complete. The wheat germ cake was recovered and analyzed to show it retained about 0.74% of the fat (based on ether extract).

EXAMPLE 11

The apparatus of Example 1 was charged with 100 grams of wheat germ meal in the manner of Example 10. The cylinder was pressurized with $CO_2$ to 12,000 psi. The pressure release valve was opened and the $CO_2$ gas with the entrained wheat germ oil was allowed to bleed off until the pressure in the cylinder reached 4,000 psi. This required about 24 seconds. The piston was then lowered, maintaining the pressure at 4,000 psi.

The wheat germ cake was recovered and analyzed. It contained 1.94% of retained fat.

EXAMPLE 12

Another extraction was run in the manner of Example 10, wherein 33 grams of wheat germ were charged into the cylinder which was then charged to 12,000 psi with carbon dioxide. This gave a ratio of 11 parts of gas by weight to 1 part of wheat germ by weight. After soaking for 5 minutes, the $CO_2$ was allowed to bleed off while maintaining the temperature at 46° C. The bleeding was allowed to reduce the cylinder to 1,500 psi. Thereafter, the cake was flushed with $CO_2$ for 5 minutes using 1,500 psi $CO_2$.

The cake was recovered. Analysis indicated the cake had 6.19% retained fat.

EXAMPLES 13-16

Examples 13 through 16 were carried out in apparatus illustrated by FIG. 1 and described in Example 1. In each case, 100 grams of wheat germ containing 10.5% fat was placed in the cylinder and moistened with the co-solvent shown in Table II below. In Examples 13 through 15, carbon dioxide was then charged to 950 psi and the piston was lowered to achieve a pressure of 4,000 psi. Mass transfer separation of the $CO_2$, co-solvent, and dissolved oil from the solids was carried out at 4,000 psi. The retained fat of the solids cake is also shown.

In Example 16 no carbon dioxide was used, but the cake was compacted to 12,000 psi in the presence of the isopropanol.

It is estimated that the extraction of wheat germ using the above amounts of isopropanol or hexane without carbon dioxide and without high pressure would produce a cake having 6-8% retained fat.

The results of Examples 13 through 17 are shown in Table II.

TABLE II

|  | 13 | 14 | 15 | 16 |
|---|---|---|---|---|
| Wheat Germ - g | 100 | 100 | 100 | 100 |
| Co-Solvent | Isopropanol | Hexane | Isopropanol | Isopropanol |
| Co-Solvent Amt. | 50 ml | 50 ml | 25 ml | 50 ml |
| $CO_2$ Charge | 950 psi | 950 psi | 950 psi | None |
| $CO_2$ Pressure | 4,000 psi | 4,000 psi | 4,000 psi | None |
| Compaction | 4,000 psi | 4,000 psi | 4,000 psi | 12,000 psi |
| Retained Fat % | 1.26 | 1.76 | 2.56 | 2.98 |

EXAMPLE 17

The apparatus described in Example 1 was charged with 100 grams of crushed, whole rapeseed, including some hull fragments. The charged solids contained 42.6% oil, by weight.

Carbon dioxide was charged to the system to 11,000 psi at a temperature of 55° C. This gave a ratio of 3 parts by weight of carbon dioxide for each part by weight of seed. Following the procedure of Example 3, the piston was lowered and the carbon dioxide-rapeseed oil mixture was discharged. The rapeseed oil was recovered.

The resulting cake, in two similar experiments, contained 7.57% and 9.86% retained oil by weight, based on ether extract. This indicates that about 85% to 90% of the oil was extracted from the seed.

EXAMPLE 18

Extraction of Soyflakes

Soyflakes of <0.010" thickness were adjusted to 15% moisture at the time of flaking. Flakes at the time of extraction contained 19.8% oil and 13.6% moisture.

$CO_2$ extraction was carried out at 12,000 psig pressure, 80° C. temperature, and with varying $CO_2$/flakes ratios. In our "mass transfer" apparatus, 100 g of soyflakes were extracted by once, twice and thrice pressing, corresponding to 4.4, 8.2 and 12 to 1 ratio of $CO_2$ to flakes.

Processing conditions and analytical results are as follows:

| | Extraction Conditions | | | | |
|---|---|---|---|---|---|
| Expt. No. | Pressure psig | Temp. °C. | Time Min. | $CO_2$/Flakes Ratio | Residual Oil % |
| Unextracted flakes | | | | | 19.8 |
| 1214-1 | 12,000 | 82 | 3.75 | 12 | 0.85 |
| 1214-2 | 12,000 | 80 | 2.87 | 8.2 | 0.95 |
| 1214-3 | 12,000 | 80 | 1.28 | 4.4 | 1.81 |

EXAMPLE 19

Extraction of Peanuts 100 g peanut of two products were extracted by one pressing only. Processing conditions and analytical results are as follows:

| | Extraction Conditions | | | | |
|---|---|---|---|---|---|
| Expt. No. | Pressure psig | Temp. °C. | Time Min. | $CO_2$/Peanut Ratio | Residual Oil % |
| Raw flakes, unextracted | | | | | 49.1 |
| 1215-1 | 12,000 | 78 | 3.73 | 4.4 | 12.6 |
| Roasted peanut grits, unextracted | | | | | 50.6 |
| 1215-2 | 12,000 | 75 | 2.13 | 4.4 | 12.0 |

Due to extraction of significant amount of oil, moisture of raw flakes increased from 5.2% to 7.8% and that of roasted grits increased from 1.9% to 4.0%. Oil could be easily reduced from 50 to 12% at a $CO_2$ ratio of <5 to 1.

In the case of roasted peanut extraction, significant amounts of roasted peanut flavor were obtained in extracted oil.

EXAMPLE 20

Extraction of Cottonseed 100 g of cottonseed flakes (protein 34.8%, fat 33.69%, moisture 6.3%) were extracted at 12,000 psig and approximately 80° C. temperature with varying amounts of $CO_2$. In some cases, 200 g of feed was used to study thicker bed extraction. Processing conditions and results are shown in the Table below.

Extraction proceeded with no plugging up of the bottom tube, valve, or plate.

It was observed that thicker bed (200 g) showed even better efficiency. Even with ratio of 6/1 ($CO_2$/meal) residual fat was 2.4%, showing 93% reduction of original oil.

In some separate experiments, we used 10% acetone (10 ml/100 g feed) and then extracted with $CO_2$. Low residual fat (1.7%) was obtained with 10/1 ratio. Gossypol seems to have been extracted in such a system.

| | | $CO_2$ Extraction of Cottonseed Flakes | | | | | | |
|---|---|---|---|---|---|---|---|---|
| | | Extraction | | | | | Residual | |
| Expt. No. | Flakes Wt. g | Pressure psig | Temp. °C. | Time Min. | $CO_2$ Pressing | Ratio | Moisture % | Fat % |
| Unextracted Flakes | | | | | | | 6.3 | 33.6 |
| 209-3 | 200 | 12,000 | 80 | 2.00 | 1 | 3 | 7.8 | 8.9 |
| 208-1 | 100 | 12,000 | 80 | 1.58 | 1 | 6 | 6.7 | 3.9 |
| 204-1 | 100 | 12,000 | 80 | 3.25 | 2 | 10 | 5.8 | 2.6 |
| 209-2 | 100 | 12,000 | 83 | 3.75 | 3 | 15 | 5.4 | 2.4 |
| 212-1 | 100 | 12,000 | 80 | 5.70 | 5 | 25 | 4.6 | 1.9 |
| Thicker Bed Extractions | | | | | | | | |
| 212-2 | 200 | 12,000 | 80 | 3.43 | 3 | 6 | 7.3 | 2.4 |
| 212-3 | 200 | 12,000 | 83 | 3.78 | 5 | 10 | 6.0 | 2.1 |

EXAMPLE 21

Extraction of Jojoba Beans

Jojoba beans contain approximately 50% oil, 97% of which is wax esters of $C_{20}$ and $C_{22}$ chain. The oil is finding increasing uses in lubricants, cosmetics, pharmaceuticals and nutrition as food fat diluent for low calorie fat preparations. Commercially, most of the oil is produced by pressing, thus leaving a 12% residual oil in press cake, which essentially is a by-product of this processing. Oil is an expensive product.

Supercritical $CO_2$ extraction of oil was done on full fat jojoba beans and pressed cake. Extraction was carried out by placing 100 g of prewarmed flakes or cake in extraction chamber maintained at the indicated temperature.

Oil analysis was done on samples by using ether as solvent. Analytical results and processing conditions are presented in the following Table.

$CO_2$ Extraction of Jojoba

| Expt. No. | Extraction Pressure psig | Temp. °C. | $CO_2$/ Meal Ratio | Extrn. Time Min. | Residual Oil % |
|---|---|---|---|---|---|
| Unextracted Flakes | | | | | 49.4 |
| 1215-3 | 12,000 | 80 | 5 | 2.4 | 4.3 |
| 1221-1 | 12,000 | 81 | 12 | 3.6 | 1.5 |
| Pressed Cake | | | | | 12.1 |
| 1204-1 | 12,000 | 50 | 5 | 3 | 1.1 |
| 1203-1 | 12,000 | 50 | 12 | 6 | 0.52 |

Extracted oil was light yellow in color. Defatted cake was also light. Results show an excellent extraction efficiency of full fat as well as pressed cake jojoba. Full fat flakes could be reduced in fat from 49% to 1.5% and pressed cake from 12% to 0.52% at a 12/1 ratio of $CO_2$ to feed.

EXAMPLE 22

2-Level Extraction Of Vanilla Beans

Vanilla beans contain vanillin, which is indicative of vanilla flavor. Vanilla beans also contain fixed oils. Generally, common extractants remove both of these components together.

Using the process of the present invention one may first extract vanilla beans at relatively low pressure to recover a concentrate with high vanillin content and then extract the remaining vanillin and oil at higher pressures as follows:

Step I: 100 g of ground vanilla beans were placed in extractor. Liquid $CO_2$ was charged and continuously pumped for 20 minutes at 2,500 psig at 30° C. Extract was collected.

Step II: Without removing vanilla beans from extractor, $CO_2$ pressure was raised to 12,000 psig and extracted by pressing and compaction at 50° C.

Vanillin results as analyzed by high pressure liquid chromatographic method are as follows:

| Experiment No. | Pressure psig | Temperature °C. | Vanillin Concentrate % in Extract |
|---|---|---|---|
| 1127-3 a | 2,500 | 30 | 19.5 |
| 1127-3 b | 12,000 | 50 | 6.4 |

Unextracted vanilla beans contained 2.0% vanillin. After two-level $CO_2$ extraction, 85% of vanillin was extracted out leaving only 0.3% residual vanillin in extracted ground beans.

Even in liquid state of $CO_2$, extraction pressure has an effect on vanillin concentration of the extract as shown below.

| Experiment No. | Extraction Pressure psig | Temperature °C. | Vanillin Concentrate % in Extract |
|---|---|---|---|
| 212-2 | 4,000 | 8 | 13.2 |
| 212-1 | 1,400 | 8 | 23.4 |
| 222-2 | 800 | 21 | 23.6 |

EXAMPLE 23

Extraction of Paprika

Paprika contains red food color and pungent substance. In most cases it is desirable to obtain strong coloring material without having pungency. Common extractants generally extract both factors together.

$CO_2$ extracts color from paprika with varying degrees of efficiency depending upon temperature and pressure. Paprika may be extracted and fractionated by a two step process as follows:

Step I: 100 g ground paprika was placed in extractor at 50° C. $CO_2$ extraction was carried out by pressing at 3,000 psig with $CO_2$/paprika ratio of 13 to 1.

Step II: Without removing the once extracted paprika from extractor, $CO_2$ pressure was raised to 12,000 psig and extraction was carried out using another 13/1 ratio of $CO_2$.

Results of the extraction are shown below:

| Expt. No. | Pressure psig | $CO_2$/ Paprika Ratio | Pungency of Extract | % Color Extracted | Intl. Units of Color in Extract Per Gram |
|---|---|---|---|---|---|
| 918-2 I | 3,000 | 13 | Very Pungent | <5 | 49,000 |
| 918-2 II | 12,000 | 13 | Very Mild | 74 | 112,000 |

Concentration of color in second extract is 40% higher than highest concentration available in market.

EXAMPLE 24

Fractionation of Wheat Germ Oil

Wheat germ oil (WGO) contains several components, e.g., free fatty acids (FFA), triglycerides and unsaponifiable matter. The process of the present invention may be used to fractionate WGO into fractions rich in a particular component.

Preparation of Material for Extraction

Liquid wheat germ oil is transformed into solid free-flowing matrix for extraction by mixing one part of WGO and two parts by weight of an adsorbent. In this Example, the adsorbent was an inert material diatomaceous earth (DE). This technique was used for several other liquids fractionated by liquid and supercritical $CO_2$ as shown in later examples.

200 g of oil, DE mixture was placed in extraction chamber maintained at 40° C. Extractor was charged with $CO_2$ and pumped, if necessary, to a desired pressure for extraction by "mass transfer" technique utilizing one pass at a ratio of 10:1 $CO_2$ to material ratio. Extractions were conducted from 1,000 to 12,000 psig $CO_2$ pressures.

Analytical results on extract with respect to FFA (as oleic acid) are presented in the following Table:

| Expt. No. | Pressure psig | Extraction Time, Sec. | FFA (% oleic) Contents of Extract |
|---|---|---|---|
| 409-1 | 1,000 | 98 | 70.5 |
| 409-2 | 2,000 | 150 | 50.1 |
| 409-3 | 3,000 | 130 | 43.9 |
| 409-4 | 4,000 | 141 | 36.6 |
| 409-5 | 6,000 | 120 | 28.9 |
| 410-1 | 8,000 | 112 | 21.7 |
| 410-2 | 10,000 | 121 | 18.7 |

-continued

| Expt. No. | Pressure psig | Extraction Time, Sec. | FFA (% oleic) Contents of Extract |
|---|---|---|---|
| 414-1 | 12,000 | 157 | 17.6 |

Lower pressures thus favor preferential extraction of fatty acids. One application of such process is in refining of oil.

Fractionation may also be achieved by sequential extraction of wheat germ at increasing pressures. In an experiment, 109 g wheat germ was extracted at 3,000 psig and then at 12,000 psig at 50° C. FFA content of oils extracted was as follows:

| Extraction Pressure (psig) | FFA (% oleic) |
|---|---|
| 3,000 | 16.5 |
| 12,000 | 5.0 |

Oil composition can thus be changed by selective extraction.

EXAMPLE 25

Extraction of Meat Products

Meat products contain a significant amount of fat. Partially defatted meat products may be accepted as better food products by virtue of lower saturated fat and increased protein.

The following meat products were extracted with $CO_2$:
1. Ground beef;
2. Ground pork;
3. Cooked hamburger; and
4. Cooked roasted beef.

Cooked meat was extracted to see if flavor can be preserved concurrently with low residual fat.

Processing conditions and results on samples are given in the following Tables. It was found that:

1. Significant amount of fat could be easily extracted with low $CO_2$ ratios.
2. Protein content significantly increased, doubling in uncooked meat.
3. Moisture content remained almost the same after extraction.
4. Significant amount of flavor retained in cooked meats.

| | | | $CO_2$ Extraction of Meats | | | | |
|---|---|---|---|---|---|---|---|
| | | | Processing Conditions | | | | |
| | | | Extraction | | | | |
| Expt. No. | Product | Weight g | Pressure psig | Temp. °C. | Time Min. | Pressing | $CO_2$/Meal Ratio |
| | Raw | | | | | | |
| 120-2 | Ground Beef | 100 | 12,000 | 55 | 4.38 | 3 | 16 |
| 120-3 | Ground Pork | 100 | 12,000 | 55 | 4.37 | 3 | 16 |
| | Cooked | | | | | | |
| 218-3 | Hamburger | 100 | 12,000 | 50 | 2.23 | 1 | 5 |
| 218-4 | Roast Beef | 100 | 12,000 | 55 | 2.07 | 1 | 5 |

| | Extraction Results | | |
|---|---|---|---|
| Product | Fat % | Moisture % | Protein (Nx6.25) % |
| Ground Beef | 19.1 | 60.2 | 15.4 |
| Expt. 120-2 | 3.5 | 62.2 | 34.2 |
| Ground Pork | 29.2 | 56.0 | 13.1 |
| Expt. 120-3 | 5.6 | 60.3 | 27.3 |
| Cooked Hamburger | 20.3 | 53.0 | 23.5 |
| Expt. 218-3 | 7.6 | 57.8 | 32.6 |
| Roast Beef | 15.2 | 59.0 | 18.2 |
| Expt. 218-4 | 9.6 | 62.7 | 22.8 |

EXAMPLE 26

Extraction of Animal Glands

Animal glands such as hog pancreas and liver are an important source of biological active substances, e.g., enzymes. In most cases, animal fat must be removed before active ingredient can be extracted. This Example demonstrates that these glands may be extracted with $CO_2$.

Pork pancreas was dehydrated with isopropanol, vacuum dried, and ground. 100 g were extracted by first pumping $CO_2$ at 12,000 psig and 70° .C for 30 minutes, then by pressing at 12,000 psig.

Pork livers were dried under vacuum and ground. 100 g were extracted at 12,000 psig and 80° C. temperature by pressing in 5 minute duration without added $CO_2$. Extraction results are as follows:

| Expt. No. | Material | Pressure psig | Temp. °C. | Residual Fat | % Fat Extracted |
|---|---|---|---|---|---|
| | Pancreas, Dried | | | 23.3 | |
| 1107-2 | Pancreas | 12,000 | 70 | 1.69 | 92.7 |
| | Liver, Dried | | | 9.21 | |
| 916-2 | Liver | 12,000 | 80 | 7.30 | 20.7 |

Extraction of pancreas fat was much more efficient. Extracted material was light in color and could be easily ground to fine powder.

EXAMPLE 27

Fish Oil Deodorization and Fractionation

Highly unsaturated fish oils have a tendency to develop a strong fishy odor upon storage. The process of the present invention may be used to remove fishy odor from fish oil and also to increase the proportions of long chain unsaturated fatty acids, such as eicosapentaenoic acid (EPA) and docosahexaenoic acid (DHA), which have been found to be of great nutritional value.

Fish oil was mixed with diatomaceous earth in 1:2 ratio. 100 g mixture was placed in extractor at 35° C. Extraction with $CO_2$ was carried out at 4,000 psig pressure using $CO_2$ at 8 times the weight of mixture. Extract was of very strong fishy odor. Second extraction on once extracted material was carried out at 12,000 psig. Results of extractions are shown below.

| Expt. No. | Extraction Pressure (psig) | Extraction Time - Sec | $CO_2$ Ratio | Odor | Iodine Value |
|---|---|---|---|---|---|
| 324-2 a | 4,000 | 190 | 8 | Very Strong | 173 |
| 324-2 b | 12,000 | 138 | 12 | Mild | 190 |

Untreated fishy oil had fishy odor and iodine value of 174. The fish oil produced in second fractionation (12,000 psig) was significantly improved in odor and increased in iodine value, indicating enhancement of long chain fatty acids (EPA and DHA).

EXAMPLE 28

Extraction of Wool and Fractionation of Wool Fat

Raw wool contains valuable fat which is an important source of lanolin and cholesterol. Commercially this fat, called "wool grease", is extracted with organic solvents. Further purification is done to make usable products. A complex process is utilized to fractionate wood grease in its constituents.

The purpose of this Example is to demonstrate the extraction of wool grease with $CO_2$ and further fractionation of the grease on the basis of pressure gradient. Raw wool was cut from raw sheep hide obtained from a local packing house. For the first experiment clean, white wool was used. For later two experiments an average, uncleaned wool was extracted.

Processing conditions and results are shown in subsequent Tables. In a single step process, fat could be reduced by 97% (120-1) easily. Extract was white and contained 50% unsaponifiables.

In fractionation scheme, two conditions were used as follows:

| 1. 218-1 | I extraction @ 3,000 psi; then |
| | II extraction @ 12,000 on same material. |
| 2. 218-2 | I extraction @ 3,000 psi; |
| | II extraction @ 6,000 psi. |

In fractionation scheme, the following conclusions can be drawn:

1. First extraction at lower pressure extracts
   strong odor extract
   darker extract
   extract with lower unsaponifiables, i.e., higher lanolin compounds
2. Second extraction at higher pressure extracts
   mild odor extract
   lighter extract
   extract with higher unsaponifiables - cholesterol content of it is expected to be higher
3. Significant amount of extract is obtained even at relatively low pressure, e.g., 2,000 psi.
4. It is possible to further fractionate wool grease into its component by careful selection of temperature, pressure and $CO_2$ amounts.

Generally, the experiments show that wool grease is easily extracted.

| | $CO_2$ Extraction of Wool | | | | | | |
|---|---|---|---|---|---|---|---|
| | Processing Conditions | | | | | | |
| | | | Extraction | | | | |
| Expt. No. | Type of Wool | Weight g. | Pressure psig | Temp. °C. | Time Min. | Pressing | $CO_2$/Wool Ratio |
| 120-1 | Selected, Clean | 50 | 12,000 | 50 | 3.52 | 3 | 36 |
| | Average, not cleaned, stepwise extractions | | | | | | |
| 218-1 | A | 100 | 3,000 | 55 | 1.40 | 1 | 6 |
| | B | | 12,000 | 55 | 2.45 | 1 | 6 |
| 218-2 | A | 100 | 2,000 | 50 | 1.88 | 1 | 6 |
| | B | | 6,000 | 50 | 1.32" | 1 | 6 |

| | Extraction Results | | | |
|---|---|---|---|---|
| Expt. No. | Pressure | Moisture % | Fat % | Dry Basis Residual Fat % in Wool | Fat % Extraction |
| 120-1 | Unextracted | 14.6 | 14.3 | 16.7 | |
| | Extracted - 12,000 lbs. | 6.4 | 0.43 | 0.46 | 97 |
| 218 | Unextracted | 17.0 | 12.5 | 15.1 | |
| 218-1 | A Extracted I 3,000 | 14.0 | 2.50 | 2.91 | 81 |
| | B Extracted II 12,000 | 11.5 | 0.27 | 0.31 | 98 |
| 218-2 | A Extracted I 2,000 | 12.5 | 2.72 | 3.10 | 79 |
| | B Extracted II 6,000 | 13.5 | 1.65 | 1.91 | 87 |

| | Analysis of $CO_2$ Extracts | | | |
|---|---|---|---|---|
| Expt. No. | Extract % by Wt of Wool | Solids in Extract % | Extract Wt Dry Basis % | Unsaponifiables % in Extract Dry Basis |
| 120-1 | | 77.0 | | 50.4 |
| 218-1 A | 10.1 | 72.3 | 7.3 | 34.3 |
| B | 6.0 | 76.6 | 5.0 | 41.6 |
| Total | | | 12.3 | |
| 218-2 A | 9.0 | 75.0 | 6.7 | 31.5 |
| B | 8.1 | 69.0 | 6.2 | 37.5 |
| Total | | | 12.9 | |

EXAMPLE 29

Milk Protein Preparations

Casein is conventionally precipitated from milk using a mineral acid to adjust the pH to about 4.3 to 4.7. $CO_2$ was used to precipitate milk protein at various conditions. Best yields were obtained in Expt. 210-6 at 500 psig pressure, 47° C. temperature, 1 minute hold time before in-line filtration on sintered plate. 6.4% precipitate with 40% solids was obtained, representing yield of 2.57% on dry basis. All of the operating conditions produced a sweet whey product with at least 7.0% solids.

Processing conditions and results are shown in the Table below:

Precipitation of Milk Proteins With CO$_2$[1]

| Expt No | Milk Wt g | Press psig | Temp. °C. | Hold Time, Min | Ppt Wt g | % Solids in Ppt | Yield % Dry Wt. | % Solids In Whey |
|---|---|---|---|---|---|---|---|---|
| Skim Milk Untreated | | | | | | | 9.2 | 9.2 |
| 209-6 | 100 | 12000 | 50 | 5 | 4.3 | 18.3 | 0.79 | 7.0 |
| 209-7 | 200 | 12000 | 46 | 5 | 11.0 | 43.6 | 2.40 | 7.0 |
| 210-1 | 100 | 12000 | 43 | 0 | 5.3 | 31.8 | 1.69 | 7.2 |
| 210-2 | 100 | 8000 | 43 | 0 | 4.4 | 37.5 | 1.65 | 7.1 |
| 210-3 | 100 | 4000 | 41 | 0 | 3.7 | 42.7 | 1.58 | 7.6 |
| 210-4 | 100 | 2000 | 47 | 0 | 3.3 | 41.3 | 1.36 | 7.0 |
| 210-5 | 100 | 500 | 44 | 0 | 8.1 | 27.8 | 2.25 | 7.2 |
| 210-6 | 200 | 500 | 47 | 1 | 12.7 | 40.5 | 2.57 | 7.0 |
| 210-7 | 200 | 500 | 24 | 0 | 6.3 | 21.4 | 0.67 | 8.2 |
| 210-8 | 200 | 500 | 26 | 1 | 7.3 | 29.7 | 1.08 | 7.9 |

The data suggests the following:

1. CO$_2$ precipitates casein, even at as low as 500 psig pressure. Increased hold time helps in better flocculation.
2. Filtration provides higher yield and higher solid content.
3. Higher temperature (40°–50° C.) provides higher yield and higher solids than cooler temperature of 25° C. Longer reaction times also produce higher yields and higher solids, even lower temperatures.

Distinct advantages of the process are:

1. Since there is no mineral acid used, there is no need to remove acid from precipitated casein.
2. Whey obtained from the process is directly usable because there is no acid to be neutralized.
3. By selecting a desired temperature, various types of product can be produced by selective precipitation or co-precipitation of protein.

EXAMPLE 30

Fractionation of Vitamins A, E and K

Under proper condition of extractions, fat soluble vitamins could be selectively extracted from the mixture.

For this work, a blend of Vitamin A, E and K in coconut oil was used. Components were as follows:

| Vitamin | Component | Concentration |
|---|---|---|
| A | Vitamin A palmitate | 72,000 IU/g |
| E | d-l- tocopheryl acetate | 500 IU/g |
| K | Vitamin K$_1$ | 2.2 mg/g |

Vitamins-coconut oil solution was mixed with diatomaceous earth in 1 to 2 ratio and 100 g mixture was charged into extractor. CO$_2$ extraction was carried out at 40° .C by two methods.

Continuous Pumping

CO$_2$ was pumped at 1,000 to 3,000 psig continuously for 2 minutes. Extract was collected and analyzed by HPLC.

Mass Transfer Extraction

CO$_2$ was charged and extraction was carried out successively at 3,000, 6,000 and 12,000 psig. Fractions were separately analyzed for Vitamins A, E and K.

Analytical results as shown in following Tables suggest that Vitamin E is preferentially extracted at lower pressures while Vitamins A and K are extracted more at higher pressures.

| Extraction Pressure psig | Vitamin A IU/g | Vitamin E IU/g | Vitamin K mg/g |
|---|---|---|---|
| Extraction With Continuous Pumping | | | |
| 1,000 | 18,900 | 694 | 1.30 |
| 2,000 | 54,800 | 550 | 2.49 |
| 3,000 | 133,300 | 367 | 3.86 |
| Extraction By Mass Transfer Technique | | | |
| 3,000 | 30,800 | 612 | 1.73 |
| 6,000 | 91,400 | 467 | 3.77 |
| 12,000 | 105,900 | 449 | 3.77 |

It was found that fractionation was more efficient at lower pressures (1,000 to 3,000 psig) than at higher pressures (3,000 to 12,000 psig).

EXAMPLE 31

Separation of Vitamin E Compounds

Vitamin E is used in ester form as tocopheryl acetate or in natural alcohol form as tocopherols. Using CO$_2$ extraction it was possible to fractionate these two forms.

Equal amounts of dl- -tocopheryl acetate and dl- -tocopherol were mixed and this oily mixture was formulated in twice the amount of diatomaceous earth to make it free flowing powder. 100 g of this solid matrix was extracted with CO$_2$ at 3,000 to 12,000 psig at 40° C. in supercritical state.

Results of successive increasing pressure extraction are shown below as determined by HPLC analyses of Vitamin E compounds.

| Pressure (psig) | dl- -tocopheryl acetate (Vitamin E IU/$g$) | dl- -tocopherol (Vitamin E IU/$g$) |
|---|---|---|
| Unextracted | 500 | 500 |
| 3,000 | 520 | 313 |
| 6,000 | 378 | 546 |
| 12,000 | 297 | 766 |

Acetate form is thus preferentially extracted at lower pressures.

EXAMPLE 32

Extraction Of Ergosterol From Yeast

Vitamin D$_2$ is commercially produced by ultraviolet irradiation of ergosterol. Ergosterol is naturally found in yeasts, but to extract ergosterol from yeast a complicated process of saponification and solvent extraction is generally employed. We tried CO$_2$ extraction process to evaluate extraction feasibility.

Following two types of yeasts were used:
1. Yeast prepared by vacuum drying of Anheuser Busch pressed cake.
2. Fleischmann's Rapid Rise all natural dried yeast-Baker's yeast from store.

Dried ground yeast (100 g or 65 g) was placed in extractor and was treated with $CO_2$ by pressing three times. Unextracted and extracted yeast samples were analyzed for fat and ergosterol content. Processing conditions and results are shown in the following Table.

| | Extraction Conditions | | | | | |
|---|---|---|---|---|---|---|
| Expt. No. | Pressure psig | Temp. °C. | Time Min. | $CO_2$/Yeast Ratio | Ergosterol % | % Ergosterol Extrd |
| Dried, Pressed Cake | | | | | 0.83 | |
| Dried, Extrd 1215-4 | 12,000 | 80 | 3.0 | 2.0 | 0.72 | 13.3% |
| Bakers Yeast Fleischmanns | | | | | 0.81 | |
| Baker's Extrd 1215-5 | 12,000 | 80 | 2.6 | 3.0 | 0.72 | 11.1% |

Results show that ergosterol in the range of 10–15% is extracted with a $CO_2$ ratio of 20 to 30.

EXAMPLE 33

Extraction Of Ergosterol From Yeast

The previous Example illustrates $CO_2$ extraction of yeast without any pretreatment. Extraction was <15% of ergosterol. Further work was done to study the $CO_2$ extraction efficiency on Anheuser Busch pressed cake (30% solids).

Samples were prepared by the following two methods:

Methanol Dehydration 450 g yeast cake was stirred with 1 liter methanol and filtered. Cake at this time had 45% volatiles.

Plasmolysis 400 g of cake was treated with diethylamine and 1.5 liter methanol. Treated cake had 50% volatiles (moisture and methan-ol).

Treated yeast (100 g) was extracted with $CO_2$ at 12,000 psig and 60° C. temperature using 3 pressings. Processing conditions and results are shown in the following conditions. Significant amount of ergosterol up to 50% was extracted even from this yeast, which is fairly low - <1% in ergosterol. Process can be developed for more efficiency by adjusting the $CO_2$/yeast ratio and using yeasts which are high (3 to >5%) in ergosterol.

One advantage of using methanol treatment is that extract is in methanol matrix and further crystallization of ergosterol can be done easily. Also, extracted yeast is defatted with no contamination from caustic or hazardous solvents normally used in ergosterol extraction.

| $CO_2$ Extraction of Yeast | | | | | | |
|---|---|---|---|---|---|---|
| | | Processing Conditions | | | | |
| | | Extraction | | | | $CO_2$/ |
| Expt. No. | Type of Yeast | Pressure psig | Temp. °C. | Time Min. | Pressings | Yeast Ratio |
| 107-1 | Methanol Treated | 12,000 | 60 | 5.20 | 3 | 20 |
| 107-2 | Plasmolyzed | 12,000 | 60 | 3.10 | 3 | 20 |

Extraction Results

| | $CO_2$ Extraction of Yeast | | |
|---|---|---|---|
| Expt. No. | Volatile % | Ergosterol Dry Basis | Ergosterol Extracted % |
| Unextracted, Methanol Treated | 45.7 | 0.95 | |
| Expt. 107-1 | 8.2 | 0.65 | 31.6 |
| Unextracted, Plasmolyzed | 50.7 | 1.02 | |
| Expt. 107-2 | 8.2 | 0.51 | 50.0 |

EXAMPLE 34

Extraction Of Crude Oil Petroleum Sludge

Storage tank bottoms of petroleum sludge pose a significant disposal problem due to their strong odors and flammability. A method was developed to handle and extract useful petroleum fraction while making sludge easily disposable.

Diatomaceous earth at the rate of 25% by weight of sludge was mixed to make a manageable dry solid mixture. 100 g was extracted with $CO_2$ under following conditions:

| Pressure | 12,000 psig |
|---|---|
| Temperature | 40° C. |
| Time | 2.75 minutes |
| $CO_2$/Sludge Ratio | 12/1 |

Extract contained yellowish petroleum product with strong odor and moisture. Extracted material was dry looking, free flowing, almost devoid of strong smell. This material can be easily handled for disposal or recycled for re-use. Petroleum product can be recovered from extract.

EXAMPLE 35

Extraction Of Cutting Oil From Metal Shavings

Cutting oil is used for many metal cutting operations, e.g., threading, cutting pipes and some grinding operations. These metal shavings and powders with entrained oil are a waste product and a source of environmental pollution.

This work was done to see if oil could be extracted from cuttings and shavings of steel. 200 g of pipe shavings obtained from a threading operation were placed in an extractor. $CO_2$ was done at the following conditions:

| | Extraction Conditions | | | | |
|---|---|---|---|---|---|
| Expt. No. | Pressure psi | Temp. °C. | Time Min. | $CO_2$/Metal Ratio | Residual Oil % |
| Metal shavings, unext. | | | | | 5.4 |
| 1222-2 | 12,000 | 70° C. | 1.23 | 5 | 0.41 |

Cutting oil is thus easily extracted. Oil was light in color free from particulate contamination and could be reused. Metal was almost free from polluting oil.

EXAMPLE 36

Extraction Of Grinding Oil From Metal Powder

A metal powder obtained from a valve grinding operation contained approximately 25% oil and was composed of Mo, W, Cu, Fe, Cr and Co. In order to recover valuable metals from this grinding swarf, the oil would have to be removed from the swarf. $CO_2$ was used as the extractant. Processing conditions and extraction results are shown in the following Table.

A free flowing powder with less than 0.5% oil was obtained after extraction. Extracted oil could be a valuable byproduct. Powder could be easily used for metal recovery.

| Expt. No. | Extraction Conditions | | | | $CO_2/$ Metal Ratio | Residual Oil % |
|---|---|---|---|---|---|---|
| | Powder Wt. g | Pressure psi | Temp. °C. | Time Min. | | |
| Metal powder, unext. | | | | | | 26.8 |
| 330-1 | 400 | 12,000 | 65 | 1.5 | 1.4 | 7.7 |
| 330-2 | 250 | 12,000 | 90 | 4.1 | 5.2 | 0.45 |

EXAMPLE 37

Extraction Of Spent Nickel Catalyst

Nickel catalyst is used in hydrogenation of vegetable oil. After the reaction, used catalyst is filtered out. This "spent catalyst" is usually regenerated by some means. A significant amount of oil, up to 50%, may be present in spent catalyst. Our $CO_2$ extraction method was tried to extract spent catalyst.

100 g of catalyst was placed in extractor. Extraction was done by pressing once or three times to study the effect of increasing $CO_2$ amounts.

Operating conditions and analytical results are shown in the following Table.

| Expt. No. | Extraction Conditions | | | $CO_2/$ Catalyst Ratio | Residual Oil % |
|---|---|---|---|---|---|
| | Pressure psig | Temp. °C. | Time Min. | | |
| Unextracted catalyst | | | | | 39.7 |
| Extrd. | | | | | |
| 1207-4 | 12,000 | 60 | 2 | 4.4 | 9.2 |
| 1210-1 | 12,000 | 50 | 3 | 12 | 0.40 |

An efficient extraction is thus obtained. Recovered oil could be used as a useful product. Oil free spent catalyst may be regenerated more efficiently.

EXAMPLE 38

Extraction of Hazardous Materials From Soil

Contamination of soil from hazardous organic material is becoming an increasing problem. The following two types of soil were used:
1. Sandy soil; and
2. Clay, acid activated Filtrol 105.

Soil was treated first with 5% (ml/100 g) xylene. 200 g of this soil was placed in extractor and extracted with $CO_2$ under the conditions outlined in the following Table. Extraction results are also tabulated.

High pressure liquid chromatographic (HPLC) method was developed for quantitative determination of initial and residual xylene. Xylene could be reduced from 51,800 ppm (5.18%) to 92 ppm in sandy soil and to 146 ppm in clay. This represents over 99.7% removal of added xylene, thus suggesting a practical application of this process. Other chemicals can similarly be extracted with $CO_2$ at high pressures.

Extraction of Xylene

| Expt. No. | of Soil | Wt. of Soil g | Processing Conditions Extraction | | | | $CO_2/$ Soil Ratio |
|---|---|---|---|---|---|---|---|
| | | | Pressure psig | Temp. °C. | Time Min. | Pressing | |
| 212-4 | Sandy | 200 | 12,000 | 60 | 2.62 | 3 | 7 |
| 212-5 | Clay | 200 | 12,000 | 60 | 2.22 | 3 | 7 |

| Extraction Results | | |
|---|---|---|
| Xylene Content | Sandy Soil 212-4 | Clay 212-5 |
| Unextracted % by Weight | 5.18 | 5.18 |
| ppm | 51,800 | 51,800 |
| Extracted - Residual, % | 0.0092 | 0.0146 |
| ppm | 92 | 146 |
| Xylene Extracted % | 99.82 | 99.72 |

EXAMPLE 39

Extraction With Liquid Solvents

Liquid solvents, e.g., isopropanol, are not very good extractants of material (e.g., oil from oil seeds) at room temperature. Extraction power increases significantly by increasing temperature. However, selectivity of extraction decreases and thermal decomposition increases with increasing temperatures. The process of the present invention effectively extracts components at room temperature (25° C.) using liquid solvents with $CO_2$.

100 g of wheat germ was placed in extractor. 150 ml of isopropanol was added to the wheat germ. Extractor was then charged with 160 cc of $CO_2$ at the pressure shown in the Table below. Temperature of extraction was maintained at 22° C. Extraction was carried out at various pressures ranging from 500 to 6,000 psig by mass transfer method. In each case material was compacted. Results of defatting was as follows:

| Expt. No. | Pressure (psig) | Remaining Oil Content % | Volatiles % |
|---|---|---|---|
| 420-1 | 500 | 2.1 | 11.9 |
| 416-2 | 1,000 | 1.8 | 9.8 |
| 420-2 | 6,000 | 0.7 | 11.5 |
| Unextracted Germ | | 9.5 | 13.2 |

An efficient extraction was thus obtained. Volatiles (isopropanol and water) content was also low in extracted material.

Soybean flakes were also extracted by isopropanol and $CO_2$ by a similar method under the following conditions:

| $CO_2$ used | 160 cc |
|---|---|
| Isopropanol | 50 ml |
| Soyflakes | 100 g |
| Pressure | 2,000 lbs. |
| Temperature | 22° C. |

Oil content was reduced form 18.5% to 4.0%.

In all cases, extracted material was dry looking and free-flowing. It can be easily desolventized.

Advantage of the method is that extraction can be carried out with minimum solvent at low temperatures.

EXAMPLE 40

Supercritical Fluid Enhanced Filtration

This work was done to see if $CO_2$ would help in filtration of sludge with high concentration of nonfilterable solids.

Feed material for this work was selected from wheat germ processing. Sludge from the bottom of the wheat germ oil tank contains flour fines, which may be hydrated with moisture, and gum (phosphatides). The following trials were made:

A. Filtration Without $CO_2$ 100 g wheat germ oil with sludge (6.2% by weight were unfilterable solids) was placed in extractor after mixing with 1% filter aid (DE) at 40° C. 40 tons of pressure was applied with ram. No oil filtered through plate. The plate plugged up immediately.

B. Filtration With $CO_2$

In the above experiment, piston was moved upwards to allow 6" height of $CO_2$ and pressure at 12,000 lbs. (35 tons). Clear oil was obtained. $CO_2$ significantly increased filtration efficiency.

C. Filtration With $CO_2$ 100 g oil with 6.2% solids and 1% added DE was filtered at 12,000 psi. Within 50 seconds, with no change in pressure across the plate, 85 g clear oil was obtained.

D. Filtration Without Filter Aid 100 g of wheat germ oil with 6.2% solids were placed in extractor. $CO_2$ was charged and filtration was carried out at 12,000 psig and 40° C.

Clear oil was obtained. It is thus possible to filter even without filter aid.

$CO_2$ apparently reduces viscosity of oil enough to increase efficiency of filtration. Supercritical fluid enhanced filtration could therefore become practical for many hard to filter materials, e.g., distillation bottoms and other sludges. Useful material could be recovered and recycled and unwanted material could be easily disposed.

The scope of the invention herein shown and described is to be considered only as illustrative. It will be apparent to those skilled in the art numerous modifications may be made therein without departure from the spirit of the invention or the scope of the appended claims.

I claim:

1. A method of extracting soluble materials from a material to be extracted which comprises:
    contacting the material to be extracted with an extracting fluid at an elevated pressure within a defined space;
    forming a fluid mixture of said extracting fluid and extract from said material to be extracted in said defined space;
    separating said fluid mixture from the residue of said material to be extracted; and
    discharging said fluid mixture as a mass from said defined space; and
    simultaneously reducing the volume of said defined space at a rate sufficient to maintain said elevated pressure as said fluid mixture is discharged from said defined space.

2. A method as described in claim 1, wherein the insolubles of said material to be extracted is compacted as the volume of said defined space is reduced.

3. A method as described in claim 1, wherein said extracting fluid is carbon dioxide.

4. A method as described in claim 1, wherein said extracting fluid is selected from the group consisting of Nitrogen, Argon, and low molecular weight hydrocarbons.

5. A method as described in claim 3 or 4, wherein the material to be extracted is of animal, vegetable, oil or oil origin.

6. A process of separating material which comprises:
    contacting a liquid material with a selected quantity of $CO_2$ at a selected elevated pressure in a defined space under conditions which promote a chemical reaction which produces a solid material;
    forming a fluid mixture of $CO_2$ and the soluble component of the feed material in said defined space;
    separating said fluid mixture from the solid form during said chemical reaction and discharging said fluid mixture as a mass from said defined space;
    simultaneously reducing the volume of said defined space at a rate sufficient to maintain said elevated pressure as said fluid mixture is discharged from said defined space; and
    compacting the residue of said solid material as the volume of said defined space is reduced.

7. A process of separating material from a solid material comprising a soluble component which comprises:
    contacting a solid material with an organic solvent and a selected quantity of $CO_2$ at a selected elevated pressure within a defined space;
    forming a fluid mixture of an organic solvent, $CO_2$ and a soluble component of said solid material in said defined space;
    separating said fluid mixture from the insoluble portion of said solid material at said elevated pressure and discharging said fluid mixture as a mass from said defined space;
    simultaneously reducing the volume of said defined space at a rate sufficient to maintain said elevated pressure as fluid mixture is discharged from said defined space; and
    compacting the residue of said solid material as the volume of said defined space is reduced.

8. A process of separating materials which comprises:
    contacting a solid vegetable material with a fluid at a selected, elevated pressure within a defined space;
    forming a fluid mixture of said fluid and a component of said solid material at said elevated pressure in said defined space;
    separating said fluid mixture from the insoluble portion of said solid material at said elevated pressure and discharging said fluid mixture as a mass from said defined space; and
    simultaneously reducing the volume of said defined space at a rate sufficient to maintain said elevated pressure as the fluid mixture is discharged from said defined space.

9. A process of separating material from a solid material comprising a soluble component which comprises:
    contacting a solid vegetable material with a selected quantity of $CO_2$ at a selected elevated pressure within a defined space;
    forming a fluid mixture of $CO_2$ and a soluble component of said solid material at said elevated pressure in said defined space;
    separating said fluid mixture from the insoluble portion of said solid material at said elevated pressure and discharging said fluid mixture as a mass from said defined space;

simultaneously reducing the volume of said defined space at a rate sufficient to maintain said elevated pressure as fluid mixture is discharged from said defined space; and compacting the residue of said solid material as the volume of said defined space is reduced.

10. The process as described in claim 9, wherein said compacted solid material is contacted with a second selected quantity of $CO_2$ at a different elevated pressure within a defined space;

forming a second fluid mixture of $CO_2$ and a soluble component of said compacted solid material in said defined space;

discharging said second fluid mixture as a mass from said defined space; and simultaneously reducing the volume of said defined space at a rate sufficient to maintain said elevated pressure as said second fluid mixture is discharged from said defined space.

* * * * *